Sept. 20, 1949.  B. E. HILL  2,482,110
POWER TRANSMISSION MECHANISM
Filed Sept. 11, 1946  4 Sheets-Sheet 1

INVENTOR.
BERNARD E. HILL
BY Victor J. Evans & Co.
ATTORNEYS

Sept. 20, 1949.　　　　　B. E. HILL　　　　　2,482,110

POWER TRANSMISSION MECHANISM

Filed Sept. 11, 1946　　　　　　　　　　　　　4 Sheets-Sheet 2

INVENTOR.

BERNARD E. HILL by Victor J. Evans & Co.

ATTORNEYS

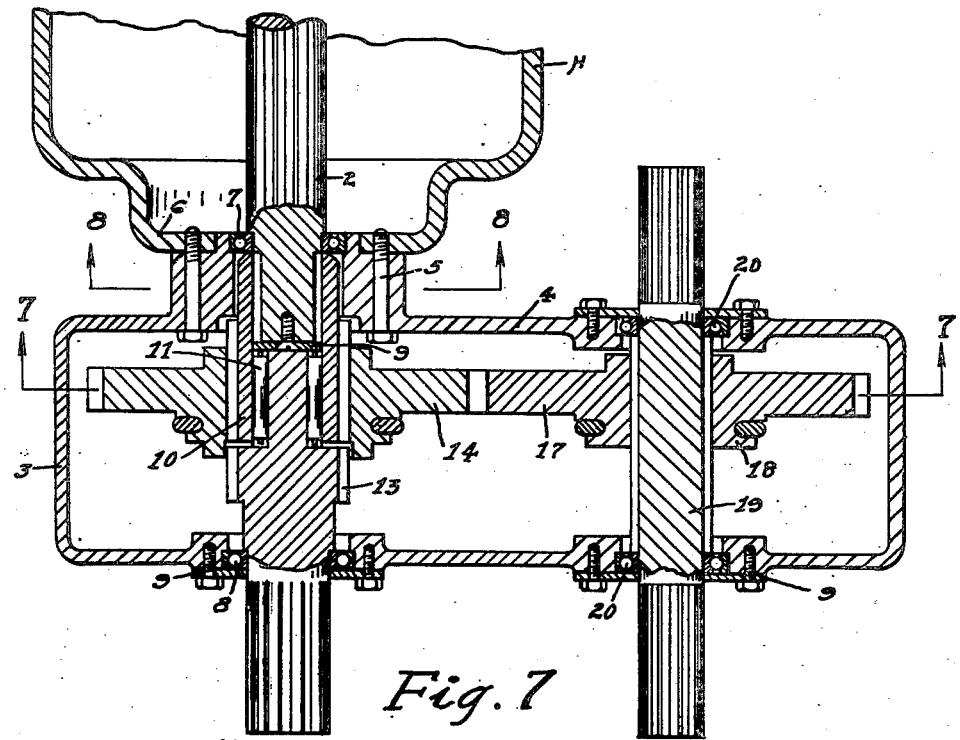
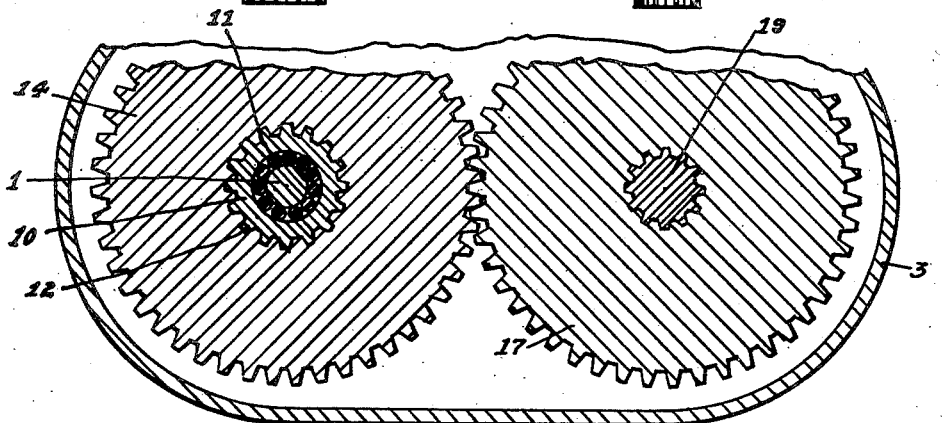

Patented Sept. 20, 1949

2,482,110

UNITED STATES PATENT OFFICE 2,482,110

POWER TRANSMISSION MECHANISM

Bernard E. Hill, Jacksonville, Fla.

Application September 11, 1946, Serial No. 696,095

1 Claim. (Cl. 74—15.88)

My present invention relates generally to improvements in power transmission mechanism for automotive vehicles, and more specifically to an improved power transmission mechanism for selective auxiliary use in the rotary transmission of power from the motor to the driving mechanism of the vehicle.

In addition to the performance of its functions as a power take-off mechanism for operating various types of extraneous machines or appliances, the selective auxiliary power transmission of my invention may be employed as a supplemental means for increasing the driving power of the automotive vehicle, as well as for transferring some of the available power from the automotive vehicle to another vehicle, as for instance a trailer vehicle.

The primary object of the invention is the provision of a selective auxiliary power transmission that may readily be combined with the main driving mechanism of an automotive vehicle; and the principles of my invention may be physically embodied in existing standard types of rotary driving mechanisms without materially altering or changing the construction and operation thereof, and to insure a neat, durable, and serviceable component part of the original power transmission.

By the combined use of the auxiliary mechanism with the main driving mechanism, the full capacity of the vehicle motor may be employed in propelling the vehicle, as well as for utilizing available power for operating auxiliary appliances and machinery.

The invention consists in certain novel combinations and arrangements of parts as will be hereinafter disclosed and described, and more particularly set forth in the appended claim.

In the accompanying drawings I have illustrated one complete example of the physical embodiment of my invention in which the parts are combined and arranged in accord with one mode I have devised for the practical application of the principles of my invention. It will be understood, however, that changes and alterations are contemplated and may be made in these exemplifying drawings and mechanical structures, within the scope of my appended claim, without departing from the principles of my invention.

Figure 4 is a horizontal detail sectional view, as at line 4—4 in Fig. 2 showing the transmission gears in position to divert or transfer power from the power shaft or engine shaft to the auxiliary shaft, with the drive shaft of the automotive vehicle idle.

Figure 7 is a vertical, transverse sectional view at line 7—7 of Fig. 4; and

Figure 1:
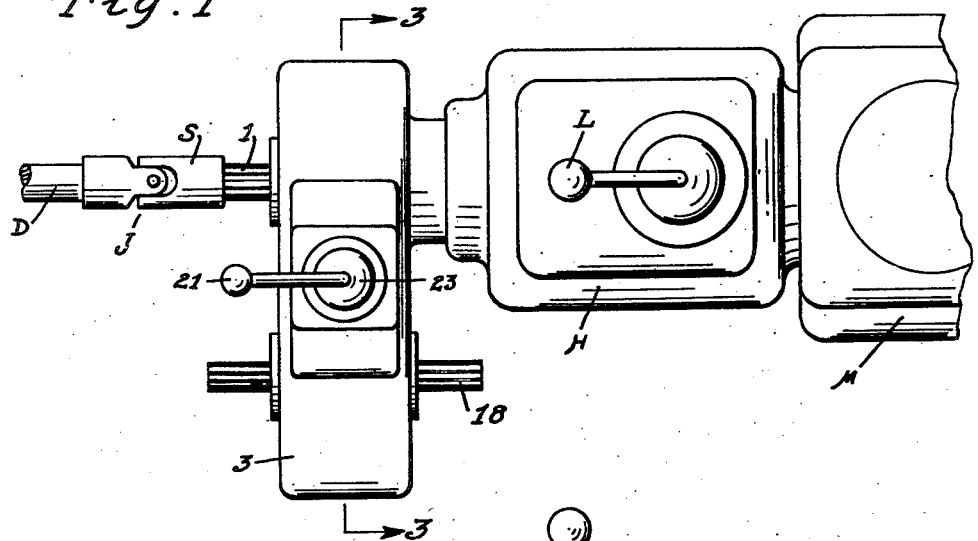
Figure 1 is a top plan view of the power plant and transmission mechanism of an automotive vehicle, together with the auxiliary mechanism of my invention, showing the general assembly and relation of parts.
Figure 2:
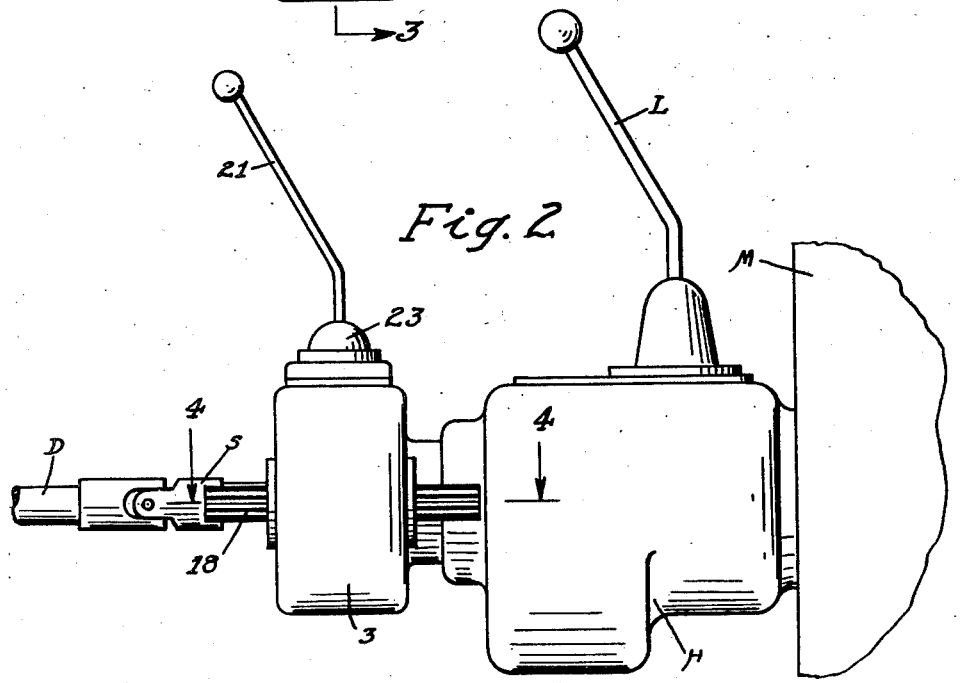
Figure 2 is a side elevation of the structures in Fig. 1.

For a clear understanding of the relation of parts, I have shown in the assembly views Figs. 1 and 2 so much of the power plant of an automotive vehicle as is necessary to indicate the construction and operation of the auxiliary mechanism. The illustrated parts include a portion of the motor M, the housing H for the variable speed transmission with its shift-lever L, and a portion of the vehicle drive shaft D that extends longitudinally and rearwardly to the differential gearing. The drive shaft D forms a part of a sectional, flexible, propulsion shaft or propelling shaft, that includes a universal joint J with its sleeve S fixed on a splined main-shaft section 1, and the power shaft or engine shaft 2 that is revolved by the motor M.

As shown in Fig. 4 the splined power shaft 2 and the drive shaft 1 are axially alined to form a joint, and the joint is located in a gear housing 3 located at the rear of the variable speed gear transmission housing H, and disposed transversely of the vehicle.

The gear housing 3 is provided with an integral front open boss or bushing 4 of rugged and durable character, which is drilled for a series of attaching bolts 5 that are threaded in an attaching flange 6 at the rear end of the variable speed transmission housing H, and the gear housing is thus compactly arranged to occupy a minimum space.

Near its rear end the power shaft 2 is journaled in ball bearings 7 mounted in the attaching boss or bushing 4, and the splined drive shaft 1 is mounted in ball bearings 8 at the rear side of the housing 3, the usual plates 9 being employed to retain the bearing parts.

The rear end of the power shaft 2, as shown, is equipped with a coupling sleeve 10 that is rigidly splined on the shaft to revolve therewith, and the sleeve is of ample length to enclose the reduced end of the axially alined drive shaft 1, and to provide for a connection between these shaft ends a set of roller bearings 11 is interposed between the enclosing sleeve and the reduced end of the drive shaft.

Figure 5:
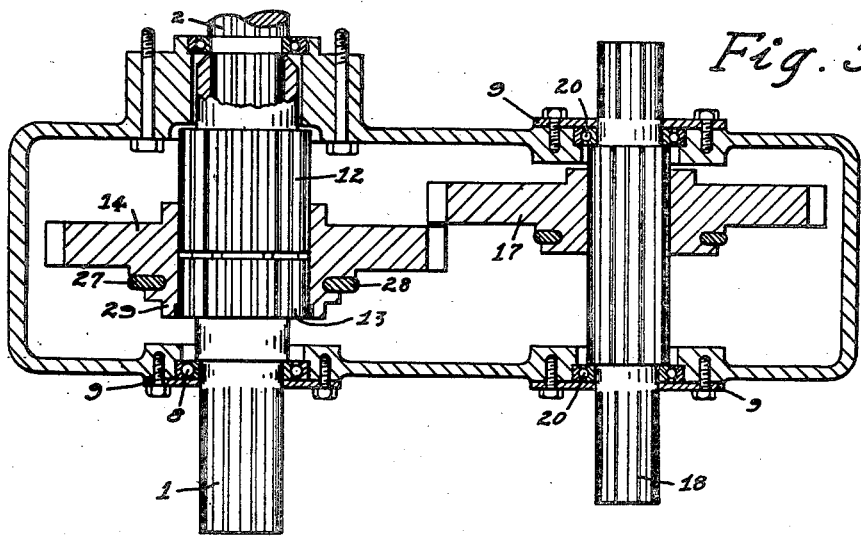
Figure 5 is a detail horizontal sectional view showing the transmission gears in position to operate the drive shaft of the vehicle, while the auxiliary shaft remains idle.
Figure 6:
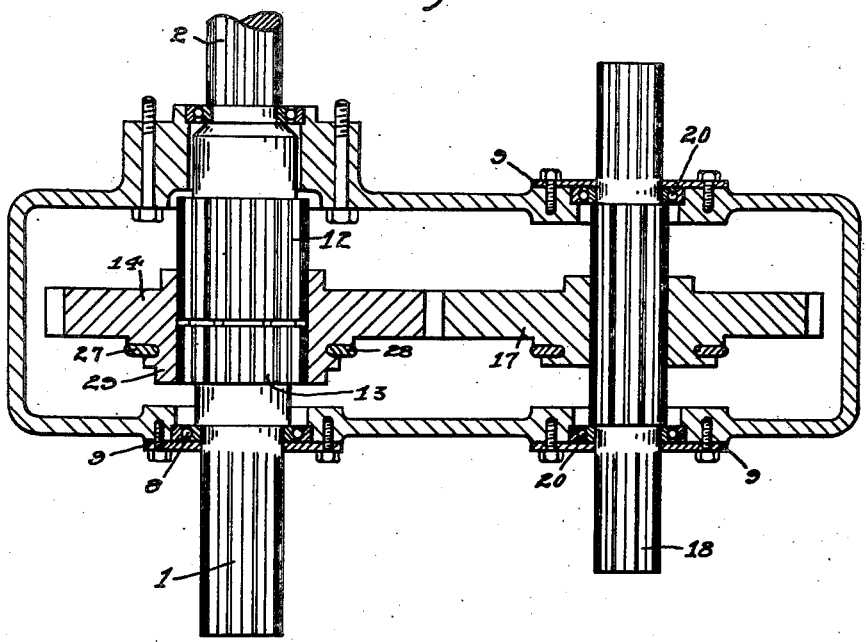
Figure 6 is a view similar to Fig. 5 with the transmission gears in position to drive both the vehicle drive shaft and the auxiliary shaft.

As best seen in Figs. 5 and 6, the end of the drive shaft 1 within the housing gear is provided with external teeth or a gear ring 12, while a portion of the coupling sleeve is fashioned with an axially alined series of teeth 13 forming a gear ring of approximately twice the length of the shorter gear ring 12 of the drive shaft 1.

For selective engagement to co-act with the power shaft and the drive shaft a shift gear 14 having internal gear teeth 15 engaging the gear rings 12 and 13 is mounted over the joint, and the shift gear is provided with external teeth 16 adapted for selective engagement with an auxiliary shift gear 17.

The hub 18 of the shift gear 17 is splined upon an auxiliary shaft 19 that is journaled in spaced bearings 20 of the gear housing, and as shown the auxiliary shaft extends longitudinally of the vehicle in parallelism with the flexible propelling shaft.

The driving shift-gear 14 and the driven shift-gear 17 are mounted upon their respective supporting shafts for longitudinal sliding movement, either jointly, or singly and separately, under manual control of a single shift lever 21 located slightly to the rear of the main, or variable speed shift lever L of the automotive vehicle.

Figure 3:
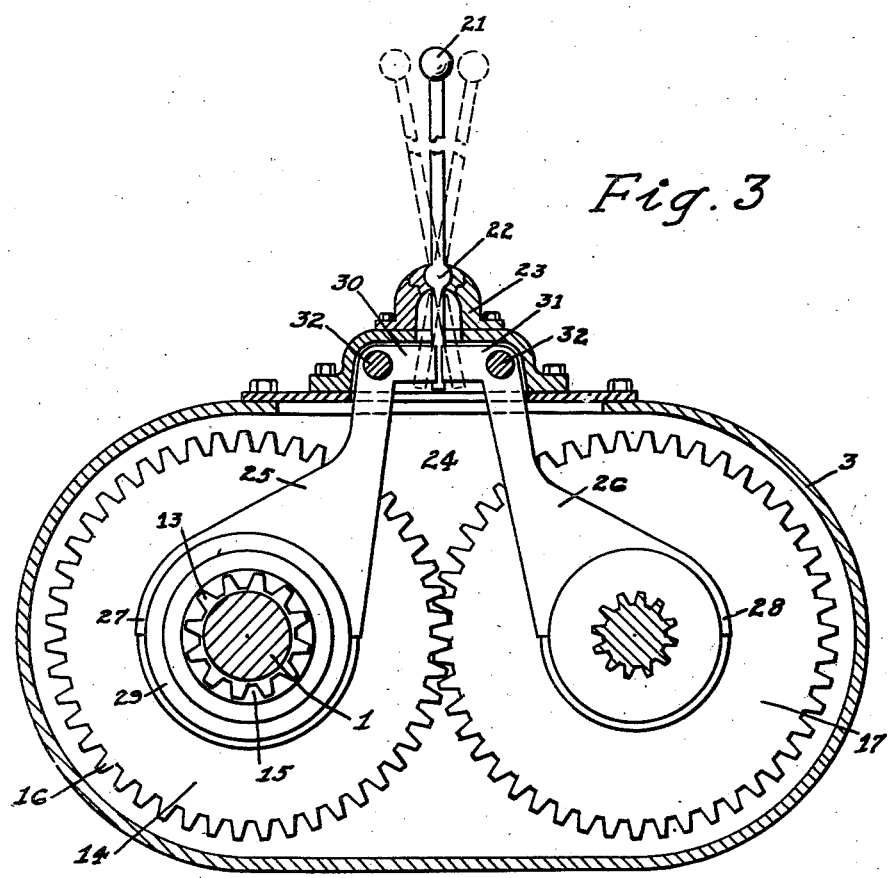
Figure 3 is an enlarged detail transverse vertical sectional view at line 3—3 of Fig. 1, showing the gear-shifting mechanism for the auxiliary transfer or transmission.
Figure 8:
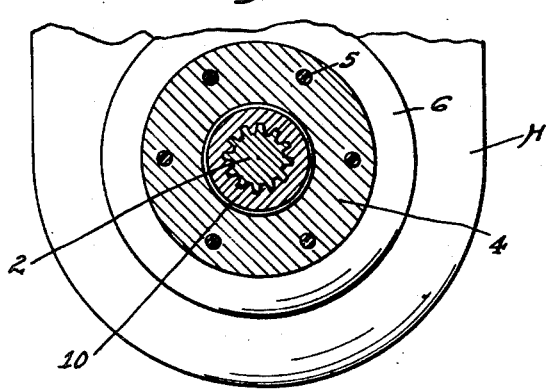
Figure 8 is a vertical transverse sectional view at line 8—8 of Fig. 4.

In Fig. 3 this auxiliary control lever is journaled with a spherical or ball-bearing 22 in a casing 23 mounted on top of the gear housing 3, and the lever with its universal pivot joint is provided with an interior actuating head 24 for selective co-action with two transversely arranged longitudinally slidable shifting arms 25 and 26. The oppositely extending arms are provided with forked ends 27 and 28 that are engaged in annular grooves in the hub 29 of gear 14, and in the hub 18 of the auxiliary shift gear 17 respectively.

The lever arms 25 and 26 are provided with angular heads 30 and 31 opposed to each other, and these heads are slidably mounted upon a pair of parallel longitudinally extending bearing rods or guide rods 32 and 33; and as indicated in full lines Fig. 3 with the head 24 of the lever 21 engaging both heads 30, 31 of the shifting arms, both of the transmission gears 14 and 17 may be shifted to position of Fig. 6 where power is being transferred from the power shaft 2 simultaneously through the flexible propeller shaft to the drive wheels of the vehicle, and to the auxiliary shaft.

By a pre-lateral swing of the shift lever on its pivot head to the left hand dotted position of Fig. 3 the lever may be shifted to disengage the auxiliary gear 17 from the driving gear 14 in Fig. 6, and shifted to position of Fig. 5, where power from the power shaft 2 is operating to propel the vehicle while the auxiliary mechanism remains idle.

By a pre-lateral swing of the lever 21 to the right hand dotted position it may be shifted to actuate arm 25 which slides gear 14 from its position in Fig. 5 into engagement with gear 17 as in Fig. 4, and power will be transmitted from the power shaft 2 to the auxiliary shaft 18 only, the drive shaft 1 remaining idle and disconnected from the power shaft.

The auxiliary shaft may be connected at its front or rear ends with supplemental mechanism for driving wheels of the automotive vehicle, and this transmission of power may readily be controlled by the lever 21.

While the automotive vehicle is stationary and the drive shaft D is disconnected, power under selected speed from the power shaft may be taken off through the auxiliary mechanism and applied to operate various types of appliances, and machinery.

While the automotive vehicle is traveling under operation of the flexible propelling shaft, power may be taken through the auxiliary transfer mechanism for transmission to another part of the automotive vehicle; or to a trailer van that is being towed by the vehicle, for operating a refrigerator, or other appliance on the trailer van.

By the use of a winch or windlass and cable, the auxiliary mechanism in combination with the vehicle driving mechanism may be utilized to extricate the vehicle so equipped from a stalled position; and under the same conditions the automotive vehicle may be utilized to extricate another vehicle from a stalled condition.

Having thus fully described my invention, what I claim as new and desire to secure by Letters Patent is:

A power take off transmission adapted to be connected to a splined power output shaft, a gear housing adapted to be connected to a housing containing the output shaft, a sleeve adapted to be splined to the output shaft and extend into the gear housing, said sleeve having external splines, a large gear adjustable along said splines of the sleeve and having splines for connection therewith, a shaft extending from the gear housing and adapted for connection to a propeller shaft having splines adapted to receive the internal splines of the large gear whereby a driving connection can be effected between the sleeve and the shaft adapted to be connected to the propeller shaft, a second shaft extending through the housing and from the opposite ends thereof adapted for connection with auxiliary devices, said second shaft being splined, a gear axially slidable over the splines of the second shaft and adapted to be adjusted for engagement with the gear on the sleeve, and gear lever means connected to the gear housing and to the respective gears to selectively cause the gear on the sleeve to be placed either in engagement with the splines on the shaft adapted to be connected to a propeller shaft to couple the sleeve and the shaft or to be free of the shaft adapted to be connected to the propeller shaft and the second gear on the auxiliary shaft to be placed in either driving relation with the first gear when in either of its selective positions or free of the first gear to permit the operation of the propeller shaft alone without the operation of the auxiliary shaft.

BERNARD E. HILL.

REFERENCES CITED

The following references are of record in the file of this patent:

UNITED STATES PATENTS

| Number | Name | Date |
| --- | --- | --- |
| 1,674,072 | Soule | June 19, 1928 |
| 1,802,419 | Freeman et al. | Apr. 28, 1931 |
| 2,265,260 | Argo | Dec. 9, 1941 |

FOREIGN PATENTS

| Number | Country | Date |
| --- | --- | --- |
| 63,779 | Sweden | Jan. 27, 1925 |